Aug. 13, 1935. I. D. HOOVER 2,010,990
SHELF
Filed Nov. 21, 1933
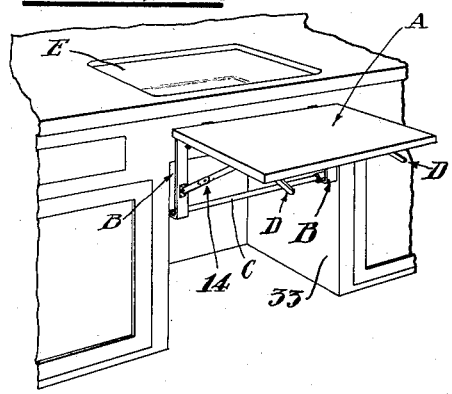
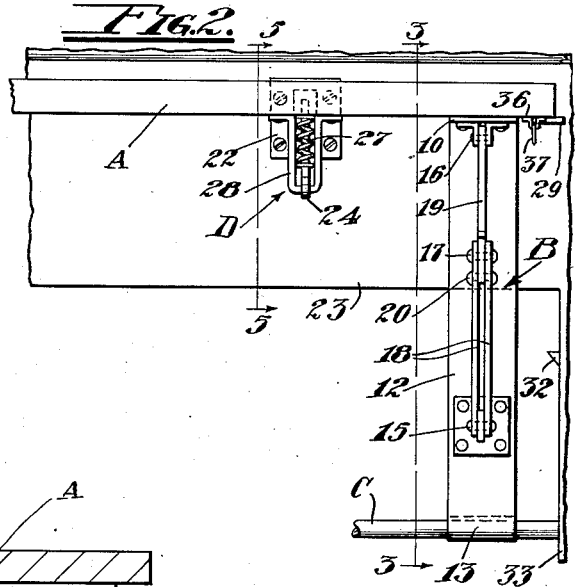
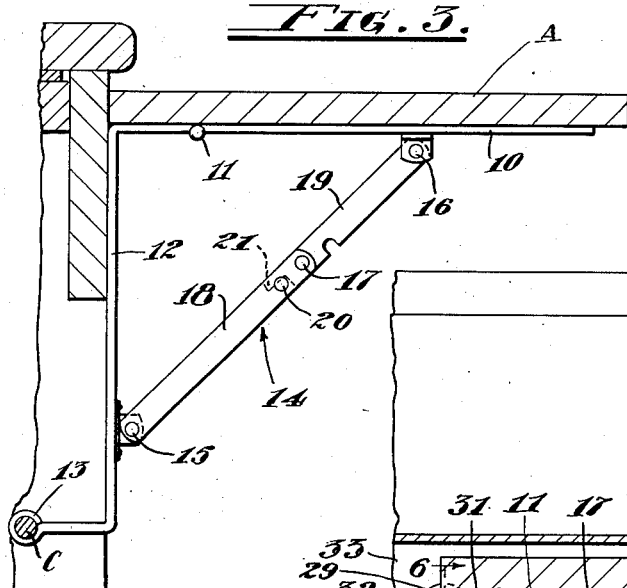
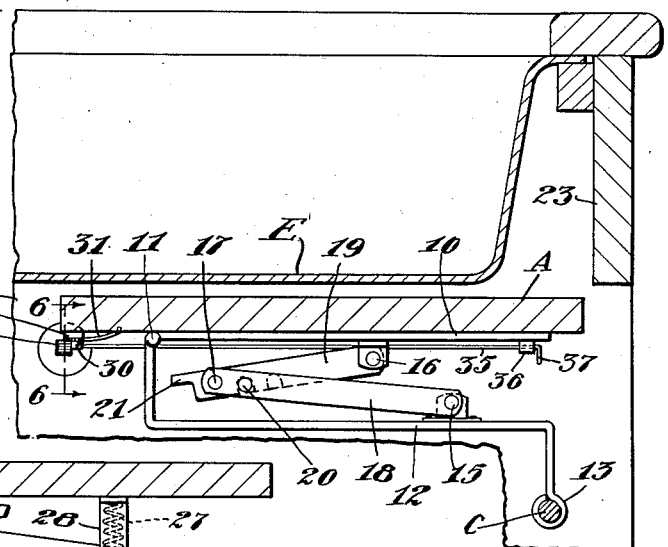
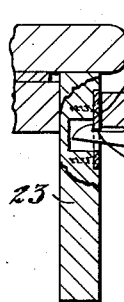
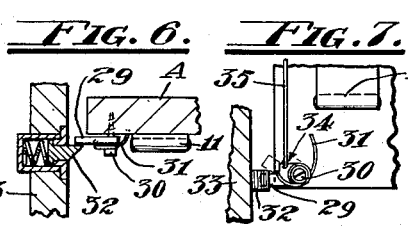
Inventor
Israel D. Hoover.
By R. S. Berry
Attorney Patented Aug. 13, 1935

2,010,990

UNITED STATES PATENT OFFICE 2,010,990

SHELF

Israel D. Hoover, Monterey Park, Calif.

Application November 21, 1933, Serial No. 698,992

2 Claims. (Cl. 312—160)

This invention relates to shelf structures and more particularly to the collapsible or foldable type of utility shelf.

An object of this invention is to provide a conveniently placed foldable shelf for the purpose of mounting or supporting devices such as food grinders, fruit juice reamers, knife sharpeners and the like.

Another object of this invention is to provide a utility shelf which may be easily arranged in a useful position when wanted and readily swung into an unused space when its services are no longer required.

Still another object is to provide a shelf of rigid construction that may be firmly held in an extended position and also be swung into an unoccupied space or recess.

In many small kitchens of the present day apartments and small homes, the sink drain boards are of tile or composition and afford practically no place on which can openers, food grinders and the like may be attached without damaging the tile or composition. Therefore it is an object of this invention to provide a suitably arranged shelf capable of being swung into place for the attachment of such kitchen utilities, thus avoiding any damage to the exposed surfaces or edges of the drainboards.

It is desirable to maintain the recess below a kitchen sink unobstructed therefore it is an object to provide a shelf of the type that may be folded and swung into this recess and be maintained in an unobstructory position.

It is not only an object to supply a convenient shelf for the purpose of attaching kitchen utilities, but also an object to provide an auxiliary table surface that may be used as a cutting or mixing board.

To provide an auxiliary foldable shelf for kitchen utilities of sturdy yet inexpensive construction that will function in a highly efficient manner is a further object of this invention.

With the foregoing objects in view together with such other objects and advantages as may subsequently appear, the invention resides in the parts and in the combination, construction and arrangement of parts hereinafter described and claimed, and illustrated by way of example in the accompanying drawing in which:

Fig. 1 is a perspective view of the shelf as applied to the kitchen sink, and showing the shelf in the extended or normal position when in use.

Fig. 2 is a fragmentary view of the shelf in the extended position shown in front elevation.

Fig. 3 is a view in section, taken along the line 3—3 of Fig. 2 showing the bracket arrangement.

Fig. 4 is a view corresponding to Fig. 3, but showing the shelf in the folded position.

Fig. 5 is a sectional view of the locking means for retaining the shelf in the extended position and taken along the plane of line 5—5 on Fig. 2.

Fig. 6 is a sectional view taken along the plane of line 6—6 of Fig. 4 showing the detent catch and the releasing mechanism for retaining the folded shelf in its unused position.

Fig. 7 is an inverted plan view of the catch and release mechanism.

Referring to the drawing more specifically, A designates a shelf which is carried on a pair of hinged brackets B pivotally mounted on a stationary shaft or rod C. The shelf structure is designed to be maintained in an extended horizontal position by a lock D, and upon release of said locking means D, the shelf assembly may be folded and swung on rod C, so that it will be disposed in a horizontal position in the space immediately below the sink E with the top or working face of the shelf uppermost and adjacent to the under side of the sink.

The bracket B includes a shelf carrying member 10 terminating at its inner end in a hinge connection 11, and a vertical member 12 extending outwardly at its top end at substantially a right angle and terminating at the hinge 11; the lower end of the member 12 extending inwardly at approximately a right angle and terminating in a bearing 13 which is supported on the rod C and arranged to partially rotate therearound. The bracket B also embodies a foldable brace member 14 whereby it is maintained in the extended position, which brace member is attached to the vertical member 12, by a pivotal connection 15, and to the shelf carrying member 10 by a pivotal connection 16. The brace member 14 may be formed in any suitable manner, but in this case an articulate joint 17 is placed between two sections 18 and 19 of which the brace member is composed. A stop pin 20 is carried on the member 18 and is arranged to engage an extended portion 21 of the member 19 thereby maintaining the brace 14 rigid when the members 18 and 19 are in alignment.

The lock D for maintaining the shelf A in the extended horizontal position consists of a keeper plate 22 mortised into the facing board 23 of the sink supporting structure, and a lever 24 fulcrumed on the lower face of the shelf by a pivot 25; the lever 24 being formed with a notch 26 on its inner end arranged to engage the keeper plate 22.

To insure a firm connection between the notch 26 and the plate 22, a spring 27 is provided with its uppermost end bearing against the lower face of the shelf and the lower end bearing against the upper edge of the lever 24; the spring 27 being disposed between the side members of a guide bracket 28 for the outer end of the lever 24.

Upon disengaging the notch 26 from the plate 22, which is effected by lifting the outer end of lever 24, the shelf A and brackets B may be swung outwardly and downwardly on the rod C, and a slight upward pressure exerted at the articulate joints 17 on the brace members 14, to fold the latter will permit the shelf supporting member 10 and shelf A to swing downwardly from the hinge 11 into a plane substantially parallel to the plane of the bracket member 12 and in this folded position to swing downwardly around the rod C and upwardly into the space below the sink.

Pivotally mounted on the lower face of the shelf so as to protrude from one end thereof is a releasing lug 29 held in place by a screw 30, and normally retained in an extended position by a spring 31. Upon swinging the folded shelf into the folded position the protruding portion of lug 29 passes over a spring detent 32 mortised into or otherwise affixed to the side panel 33 of the sink supporting structure, thereby retaining the folded shelf in its horizontal position below the sink.

To facilitate the release of the spring 32, the lug 29 is provided with a hole 34 located intermediate the pivot 30 and the end of the protruding portion and extending from said hole toward the outer edge of the shelf is a pull wire 35 which is suspended in a guide 36 and terminates in a bent down portion 37 which serves as a handle and also as a stop to limit the movement of the lug 29 due to the urge of the spring 31.

In the operation of this invention, assuming that the shelf is in the folded position and that it is desired to place it in the extended position, the spring detent 32 is released by grasping the handle 37 and exerting a pull on the rod 35 thereby drawing the lug 29 from engagement with the detent 32 thus letting the shelf assembly swing downwardly into a substantially vertical position and depending from the rod C. The brackets B are then manually opened bringing the brace sections 18 and 19 into alignment to form the rigid brace members 14. The assembly is then swung outwardly and up until the inner edge of the shelf contacts the facing board 23 of the sink supporting structure at which time the notch 26 of the lever 24 automatically engages the keeper plate 22 and maintains the shelf assembly in the extended position.

To restore the assembly to the recess below the sink the lock D is released by lifting the lever 24 thereby disengaging the notch 26 from the keeper plate 22 and allowing the shelf assembly to swing away from the facing board 23 and permitting the brace members 14 and the hinged bracket members 10 and 12 to be folded thus putting the shelf assembly in a folded position whereupon it may be swung around the rod C until the lug 29 engages the detent 32 which maintains the folded shelf in a horizontal position within the recess below the sink without materially obstructing the opening of said recess.

It is to be noted that while I have shown the shelf arrangement in the folded position being immediately below the sink, where it has no utility, it may be arranged so as to provide an auxiliary shelf by lowering the rod C, and the spring detent 32, correspondingly, thereby lowering the shelf assembly creating more space between its upper surface and the lower surface of the sink.

While I have shown and described a specific embodiment of the invention I do not limit myself to the exact details of construction and arrangement shown, but may employ such changes and modifications in the parts and in their arrangement as occasion may require, coming within the meaning and scope of the appended claims.

I claim:

1. In a shelf structure, a supporting structure having a recess, a pair of brackets pivoted to swing vertically in and out of said recess, a shelf hinged on said brackets to fold relative thereto, articulated braces connecting said shelf and brackets for holding the shelf in an extended position on said brackets, releasable means for holding said brackets in an upwardly extending position with said shelf projecting horizontally from the forward portion of said supporting structure, and releasable means for holding said shelf and brackets in their folded relation within said recess.

2. In a shelf structure, a supporting structure having a recess, a pair of brackets pivoted to swing vertically in and out of said recess, a shelf hinged on said brackets to fold relative thereto, means connecting said shelf and brackets for holding the shelf in a horizontal position when said brackets are disposed to extend upwardly, means for releasably locking the shelf in its horizontal position to project forwardly from said supporting structure, and means for holding said shelf and brackets in their folded relation within said recess.

ISRAEL D. HOOVER.